(12) United States Patent
Shinoda et al.

(10) Patent No.: US 6,853,329 B2
(45) Date of Patent: Feb. 8, 2005

(54) MONOPULSE RADAR SYSTEM

(75) Inventors: Hiroshi Shinoda, Tokyo (JP); Hiroshi Kondoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/788,354

(22) Filed: Mar. 1, 2004

(65) Prior Publication Data

US 2004/0164892 A1 Aug. 26, 2004

Related U.S. Application Data

(63) Continuation of application No. 10/385,617, filed on Mar. 12, 2003, now Pat. No. 6,750,810, which is a continuation-in-part of application No. 10/083,339, filed on Feb. 27, 2002, now abandoned.

(30) Foreign Application Priority Data

Dec. 18, 2001 (JP) ........................................ 2001-384021
Apr. 10, 2002 (JP) ........................................ 2002-107563

(51) Int. Cl.[7] ......................... G01S 13/44; G01S 13/00; G01S 13/93
(52) U.S. Cl. ........................... 342/149; 342/70; 342/80; 342/154; 342/157
(58) Field of Search ............................ 342/70, 80, 81, 342/154, 157, 147, 149, 374, 427

(56) References Cited

U.S. PATENT DOCUMENTS

| | | | |
|---|---|---|---|
| 3,965,475 A | | 6/1976 | Deerkoski et al. |
| 5,506,589 A | * | 4/1996 | Quan et al. .................. 342/427 |
| 5,815,112 A | * | 9/1998 | Sasaki et al. .................. 342/70 |
| 6,169,518 B1 | | 1/2001 | Nelson et al. |
| 6,243,052 B1 | | 6/2001 | Goldstein et al. |
| 6,246,359 B1 | | 6/2001 | Asano et al. |

FOREIGN PATENT DOCUMENTS

| | | |
|---|---|---|
| GB | 2 270 438 A | 9/1993 |
| JP | 1-180484 | 1/1988 |
| JP | 2-183191 | 1/1989 |
| JP | 2-287181 | 4/1989 |
| JP | 3-31699 | 6/1989 |
| JP | 5-273340 | 3/1991 |
| JP | 8-334557 | 6/1995 |
| JP | 2000-258521 | 3/1999 |
| JP | 2000-258524 | 3/1999 |

OTHER PUBLICATIONS

Samuel A. Sherman, "Monopulse principles and techniques", Artech House, pp. 8–19.
European Search Report dated Mar. 3, 2003.

* cited by examiner

*Primary Examiner*—Ian J. Lobo
(74) *Attorney, Agent, or Firm*—Reed Smith LLP; Stanley P. Fisher, Esq.; Juan Carlos A. Marquez, Esq.

(57) ABSTRACT

A monopulse radar system for detecting an azimuth depending upon amplitude difference or phase difference between signals respectively received by plural receiving antennas, includes: a transmitting array antenna and a receiving array antenna each including antenna elements forming an antenna train, at least one antenna switch disposed among the elements of the transmitting array antenna and/or the receiving array antenna, and a switch controller for turning ON/OFF the antenna switch to change an aperture length of the transmitting array antenna and/or the receiving array antenna thereby changing a beam shape thereof. The antenna elements of the transmitting array antenna and the receiving array antenna are formed on a dielectric substrate. A dielectric length between the antenna train formed by the antenna elements and the antenna switch is ½ dielectric wavelength.

20 Claims, 12 Drawing Sheets

MONOPULSE RADAR SYSTEM

BACKGROUND OF THE INVENTION

This application is a Continuation of non-provisional U.S. application Ser. No. 10/385,617 filed Mar. 12, 2003 now U.S. Pat. No. 6,750,810, which was a Continuation-in-Part Application of U.S. application Ser. No. 10/083,339 filed on Feb. 27, 2002 now abandoned. Priority is claimed based on U.S. application Ser. No. 10/385,617 filed Mar. 12, 2003, which claims the priority of U.S. application Ser. No. 10/083,339 filed on Feb. 27, 2002, which claims the priority of Japanese Application Nos. 2001-384021 and 2002-107563 filed on Dec. 18, 2001, and Apr. 10, 2002, respectively.

FIELD OF THE INVENTION

The present invention relates to a monopulse radar system, further detailedly relates to a monopulse radar system that radiates a radio wave, receives a reflected radio wave from a body where the radio wave is detected with plural receiving antennas and detects the direction of the detected body depending upon difference in amplitude or a phase between signals received by the plural receiving antennas and particularly relates to a monopulse radar system suitable for a radar used for a car and mounted on a mobile body such as a vehicle.

DESCRIPTION OF THE RELATED ARTS

Heretofore, a radar system used for a car and mounted on a mobile body such as a vehicle for detecting the velocity and the position of a detected body such as the mobile body and an obstacle is known. For a radar system used for a car, a radar system used for a car in which antenna beam width is switched from wide one to narrow one and vice versa corresponding to a detected body and the velocity and the position of the detected body are precisely detected and a radar system used for a car in which the direction of the detected body can be detected are developed.

For a document related to the former, for example, Japanese published unexamined patent application No. Hei 2-287181, "RADAR SYSTEM USED FOR CAR" and Japanese published unexamined patent application No. 2000-258524 can be given.

For the latter primary radar system for detecting the direction of a detected body, a mechanical scanning system of mechanically turning an antenna by a motor, a beam switching system of switching plural antennas different in the orientation of a beam (for example, disclosed in Japanese published unexamined patent application No. Hei 8-334557) and a monopulse system (for example, described on pages 8 to 19 of "Monopulse Principles and Techniques" published by ArtechHouse and written by Samuel M. Sherman) can be given.

According to the monopulse system, as shown in FIG. 10, reflected waves 29 from an obstacle 28 are received by two receiving antennas 30 and a sum signal p and a difference signal q are generated in a hybrid circuit 8. Relation between the relative electric power of the generated sum signal p and the generated difference signal q and an azimuth is as shown in FIG. 11 and relation between the ratio t of the sum signal p and the difference signal q and an azimuth is as shown in FIG. 12. As shown in FIG. 12, as the ratio t of the sum signal p and the difference signal q is a monotone decreasing function in relation to an azimuth, the azimuth of a detected body can be uniquely determined based upon the ratio t of the sum signal and the difference signal. High-resolution angle detection can be also performed in a wide range by increasing the number of receiving antennas.

Recently, it is demanded for a radar system used for a car that the direction of a detected body is precisely detected at the same time as the velocity and the position of the detected body are precisely detected. Further, as the radar system is used for a car, it is demanded that the radar system has simple configuration, is compact and the manufacturing cost is low. The above-mentioned conventional type monopulse system is excellent in azimuth resolution, compared with another system and relative miniaturization is possible. However, antenna beam width is required to be widened to enlarge a detectable directional range, a detectable distance range is narrowed and azimuth resolution is also deteriorated. To enlarge a detectable azimuth without deteriorating detectable distance and azimuth resolution, an antenna that generates a wide angle beam and an antenna that generates a narrow angle beam are required to be provided and to be switched, and there is a problem that the system is large-sized and the cost is increased.

SUMMARY OF THE INVENTION

Therefore, the invention is made to solve the problem and it is the object to provide a low-cost, compact and light monopulse radar system wherein the monopulse system is improved, a detectable range of the position (distance between an antenna and a detected body) of the detected body and relative velocity can be switched to a sharp angle/long distance or a wide angle/short distance and simultaneously the precise azimuth of an obstacle can be detected in the range.

To achieve the object, in the monopulse radar system according to the invention, at least one of a transmitting antenna and a receiving antenna is formed by an array antenna composed of plural antenna elements, the plural antenna elements are divided into plural groups, an antenna switch to switch the plural groups is provided and a switch control device to control the opening and closing of the antenna switch is provided to switch an antenna beam of at least the transmitting or receiving antenna to a sharp angle/long distance or a wide angle/short distance.

In the invention, a detectable range of distance up to a mobile obstacle and relative velocity can be switched to a sharp angle/long distance or a wide angle/short distance by switching the antenna switch of the array antenna, simultaneously the accurate azimuth of the obstacle can be detected in the detectable range and in case antenna beams cover a sharp angle and long distance, higher-accuracy azimuth detection is enabled. As a detection range is switched by connection and disconnection in units of an antenna element, multiple independent array antennas the orientation of which is determined are not required and the simple antenna switch is provided to the array antenna, the low-cost, compact and light system can be realized.

Beam switching technique in which the velocity of a detected body such as a mobile body and an obstacle and distance up to it are detected in a state of suitable beam width by switching beam width according to distance up to the detected body (disclosed in for example, Japanese published unexamined patent application No. Hei 2-287181, "RADAR SYSTEM USED FOR CAR") is known, however, according to the beam switching technique, the azimuth of a detected body cannot be detected. In the invention, it is first found and realized by combining beam switching technique and a monopulse radar system that in case antenna beams cover a sharp angle and long distance, higher-accuracy azimuth detection which is not acquired in each of the beam switching technique and the monopulse radar system is enabled, utilizing the advantages of a monopulse radar.

As a monopulse radar system according to the invention is provided with the antenna switch for switching beams from the transmitting array antenna and the receiving array antenna respectively composed of plural antenna elements to a sharp angle/long distance or a wide angle/short distance, a detectable range of distance up to a mobile obstacle and relative velocity can be switched to a sharp angle/long distance or a wide angle/short distance, as a monopulse system is used, the accurate azimuth of the obstacle can be detected in the range, in case antenna beams cover a sharp angle and long distance, higher-accuracy azimuth detection is enabled, the detectable range is switched by connection and disconnection in units of an antenna element and as plural array antennas are not required, the low-cost, compact and light monopulse radar system can be realized.

This and other advantages of the present invention will become apparent to those skilled in the art on reading and understanding the following detailed description with reference to the accompanying figures.

DESCRIPTION OF THE PREFERRED EMBODIMENTS

Figure 1:
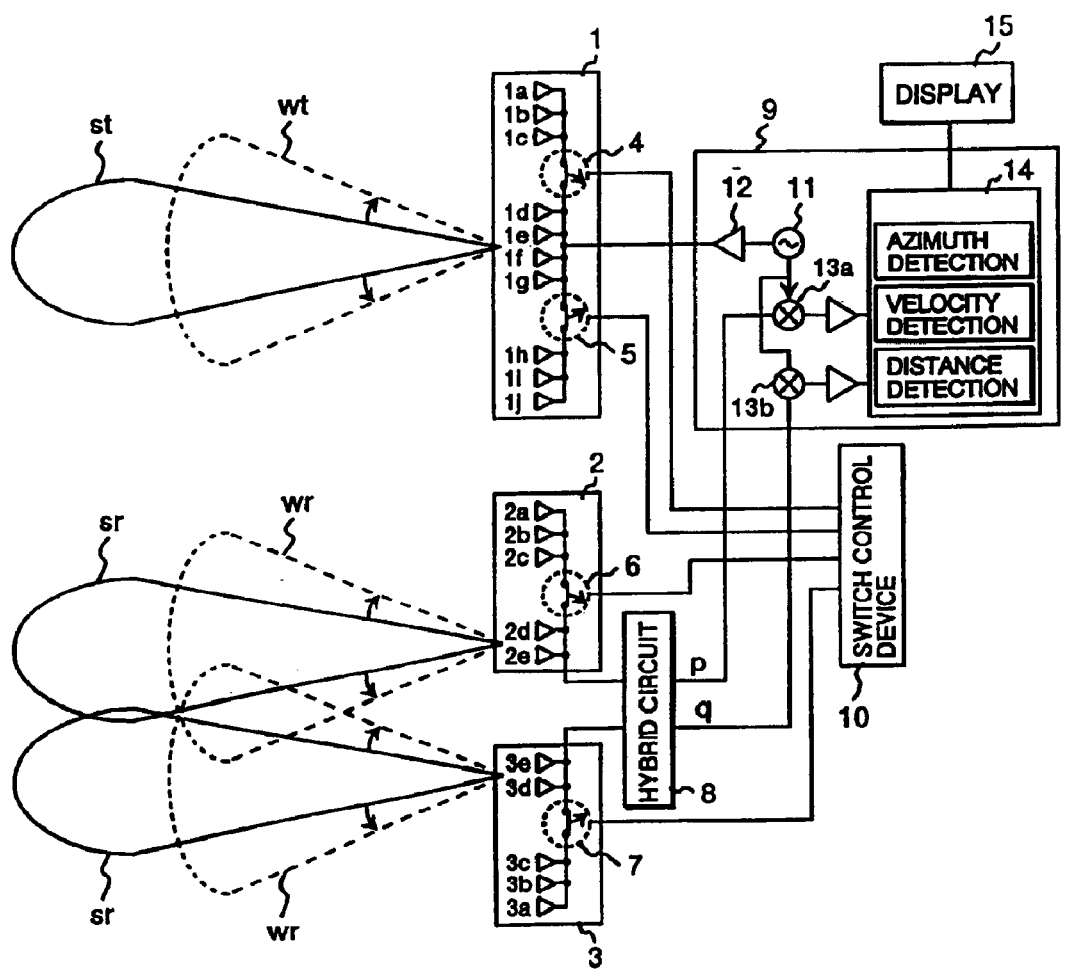
FIG. 1 is a block diagram showing a first embodiment of a monopulse radar system used for a car according to the invention.

FIG. 1 is a block diagram showing the configuration of a first embodiment of a monopulse radar system used for a car according to the invention. In this embodiment, a signal is transmitted from a transmitting and receiving device 9 via a transmitting array antenna 1 composed of plural antenna elements 1$a$ to 1$j$, the signal reflected on an obstacle is received by a first receiving array antenna 2 composed of plural antenna elements 2$a$ to 2$e$ and a second receiving array antenna 3 composed of plural antenna elements 3$a$ to 3$e$, and a sum signal and a difference signal respectively generated in a hybrid circuit 8 are sent to the transmitting and receiving device 9.

The configuration of the transmitting and receiving device 9 is identical to that of a heretofore known monopulse radar system. A millimeter-wave signal from an oscillator 11 is applied to the transmitting array antenna 1 via a power amplifier 12. The sum signal p and the difference signal q respectively generated in the hybrid circuit 8 are respectively applied to mixers 13$a$ and 13$b$, are mixed with a signal output from the oscillator 11, are respectively converted to an intermediate-frequency signal and are respectively input to a signal processing circuit 14. The signal processing circuit 14 detects the azimuth of a detected body using signals acquired by converting the frequency of the sum signal p and the difference signal q and detects the velocity and the position of the detected body using the sum signal p. The result of the detection is converted to a signal suitable for an output device 15 such as a display if necessary and is output to the output device 15.

In this radar system, as a beam shape from/to the transmitting array antenna 1 and the receiving array antennas 2 and 3 is switched to a sharp angle/long distance or a wide angle/short distance, the transmitting array antenna 1 has plural groups of antenna elements 1$a$ to 1$c$, 1$d$ to 1$g$ and 1$h$ to 1$j$ and antenna switches 4 and 5 for connecting or disconnecting each antenna element group, and the receiving array antennas 2 and 3 respectively have plural groups of antenna elements 2$a$ to 2$c$ and 2$d$ to 2$e$ and plural groups of antenna elements 3$a$ to 3$c$ and 3$d$ to 3$e$ and antenna switches 6 and 7 for connecting and disconnecting each antenna element group. Further, a switch control device 10 that controls the turning on or off of the antenna switches 4 to 7 is provided.

For example, when the antenna switches 4 to 7 are turned on by the switch control device 10 and the plural antenna elements 1$a$ to 1$j$, 2$a$ to 2$e$ and 3$a$ to 3$e$ are connected, a beam shape from the transmitting array antenna 1 is turned a sharp angle/long distance as shown by full lines st and sr in FIG. 1 and as antenna aperture length is reduced when the antenna switches 4 to 7 are turned off, that is, the antenna switches 4 to 7 are disconnected from the groups of antenna elements respectively composed of plural antenna elements 1$a$ to 1$c$, 1$h$ to 1$j$, 2$a$ to 2$c$ and 3$a$ to 3$c$, a beam shape from/to the transmitting array antenna 1 and the receiving array antennas 2 and 3 is turned a wide angle/short distance as shown by dotted lines wt and wr in FIG. 1. As described above, the detectable range of distance up to a mobile obstacle and relative velocity can be switched to a sharp angle/long distance or a wide angle/short distance by switching the antenna switches 4 to 7.

Figure 2:
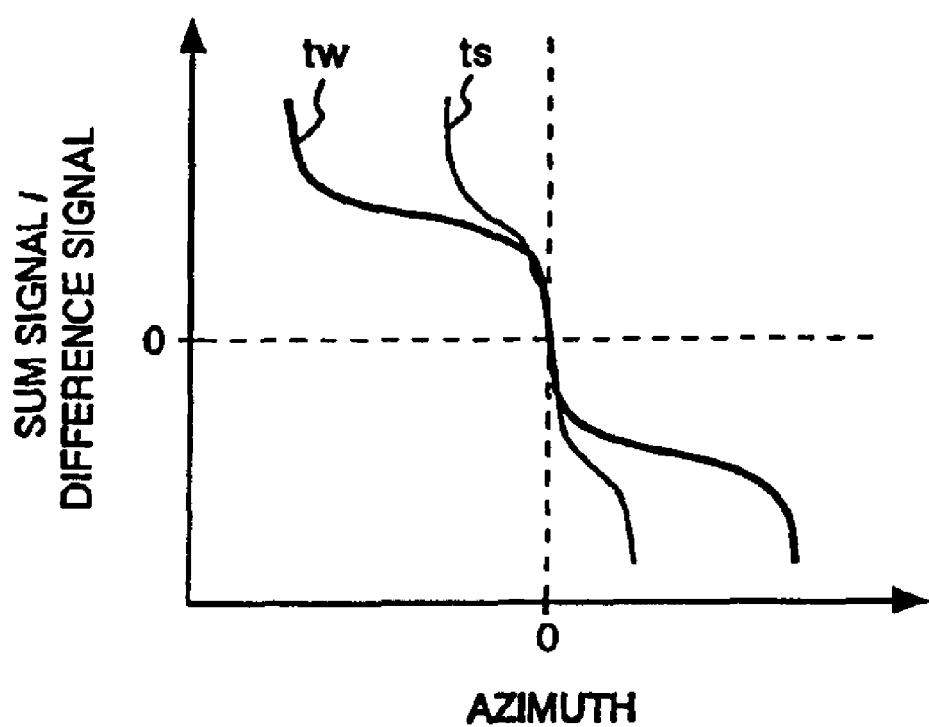
FIG. 2 shows the characteristics of a sum signal and a difference signal of a monopulse system for explaining the effect of the invention.

As in this embodiment, a monopulse system is used, the accurate azimuth of an obstacle can be detected in the range and in case antenna beams cover a sharp angle and long distance, higher-accuracy azimuth detection is enabled. That is, as shown in FIG. 2, when an antenna beam shape is switched, the relation tw of a monotone decreasing function tw when an antenna beam shape is a wide angle/short distance is kept for relation between the ratio t of a sum signal p and a difference signal q and an azimuth and as the inclination of the ratio of the sum signal p and the difference signal q is abrupt as a curve ts in case an antenna beam shape is a sharp angle/long distance, an azimuth can be precisely detected.

As a detection range is switched by connection and disconnection in units of the antenna element and plural array antennas are not required, the low cost, miniaturization and lightening can be realized. The antenna switches 4 to 7 are not particularly required to be interlocked and various detection ranges can be acquired by individually switching.

Various detection ranges can be acquired by increasing the number of the antenna elements and the antenna switches respectively shown in FIG. 1 or by varying the ratio of the transmitting array antenna 1 and the receiving array antennas 2 and 3 and azimuth resolution can be enhanced. In this embodiment, the two receiving array antennas are provided, however, the similar various detection ranges can be acquired and azimuth resolution can be enhanced by increasing the number.

Figure 3:
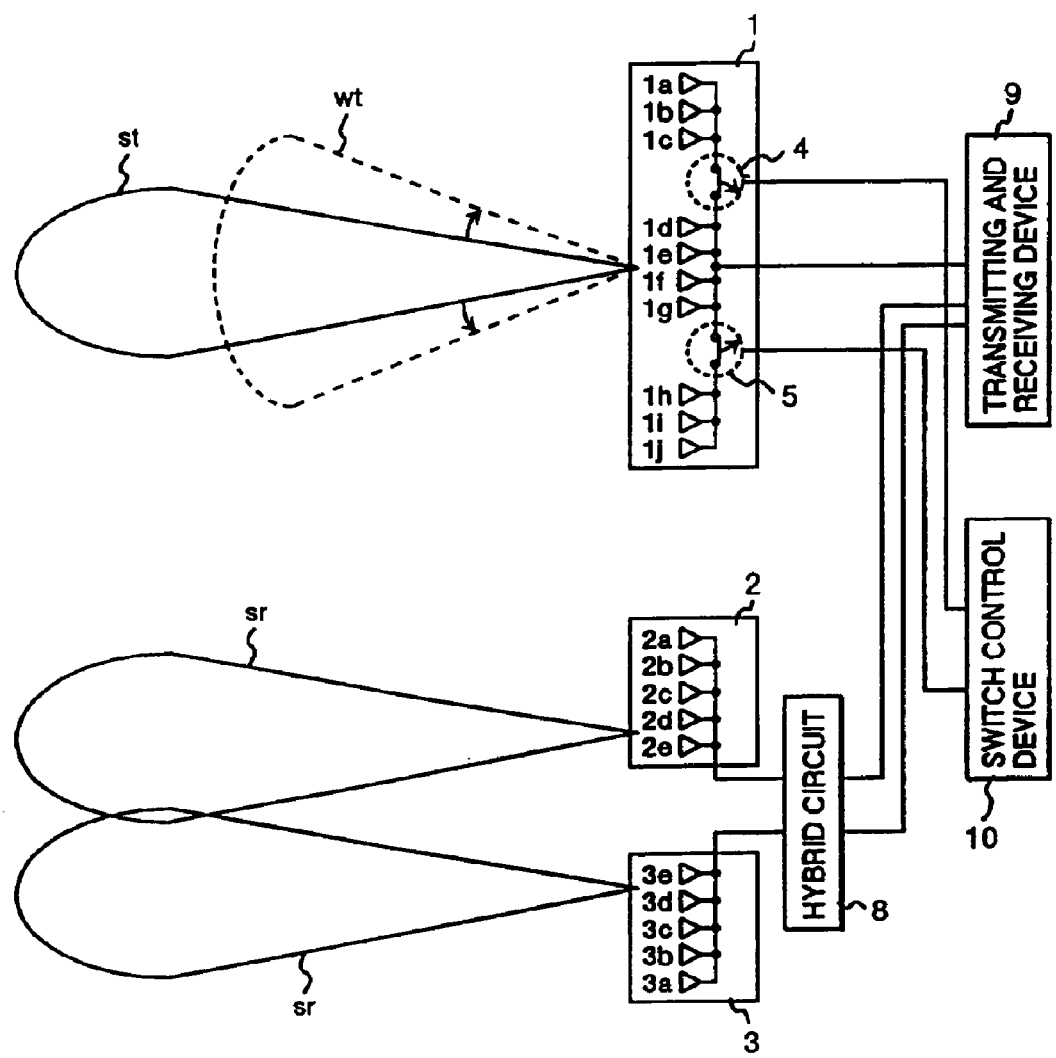
FIG. 3 is a block diagram showing a second embodiment of the monopulse radar system used for a car according to the invention.

FIG. 3 is a block diagram showing the configuration of a second embodiment of the radar system according to the invention. A monopulse radar system used for a car equivalent to this embodiment is characterized in that an antenna beam shape is switched by only a transmitting antenna 1, the configuration and the control of receiving antennas 2 and 3 are simplified, the system is simplified and the cost is reduced.

A signal is transmitted from a transmitting and receiving device 9 via the transmitting array antenna 1 composed of plural antenna elements 1a to 1j, the signal reflected on an obstacle is received by the receiving array antenna 2 composed of plural antenna elements 2a to 2e and the receiving array antenna 3 composed of plural antenna elements 3a to 3e, a sum signal and a difference signal respectively generated in a hybrid circuit 8 are sent to the transmitting and receiving device 9, and the velocity of a mobile body, the direction of an obstacle, distance up to the mobile body and relative velocity are detected. In this radar system, antenna switches 4 and 5 for connecting and disconnecting antenna element groups respectively composed of plural antenna elements 1a to 1c and 1h to 1j for switching a beam shape from the transmitting array antenna 1 to a sharp angle/long distance or a wide angle/short distance and a switch control device 10 that controls the turning on or off of the antenna switches 4 and 5 are provided.

For example, when the antenna switches 4 and 5 are turned on by the switch control device 10 and the plural antenna elements 1a to 1j are connected, a beam shape from the transmitting array antenna 1 is turned a sharp angle/long distance as shown by a full line st in FIG. 3 and as antenna aperture length is reduced when the antenna switches 4 and 5 are turned off, that is, antenna element groups respectively composed of the plural antenna elements 1a to 1c and 1h to 1j connected by the antenna switches 4 and 5 are disconnected, a beam shape from the transmitting array antenna 1 is turned a wide angle/short distance as shown by a dotted line wt. As described above, the detectable range of distance up to a mobile obstacle and relative velocity can be switched to a sharp angle/long distance or a wide angle/short distance by switching the antenna switches 4 and 5. Various detection ranges can be acquired by increasing the number of the antenna elements and the antenna switches respectively shown in FIG. 4 or by varying the ratio of antenna elements in the transmitting array antenna 1 and the receiving array antennas 2 and 3 and azimuth resolution can be enhanced. In this embodiment, the two receiving array antennas are provided, however, the similar various detection ranges can be acquired and azimuth resolution can be enhanced by increasing the number.

Figure 4:
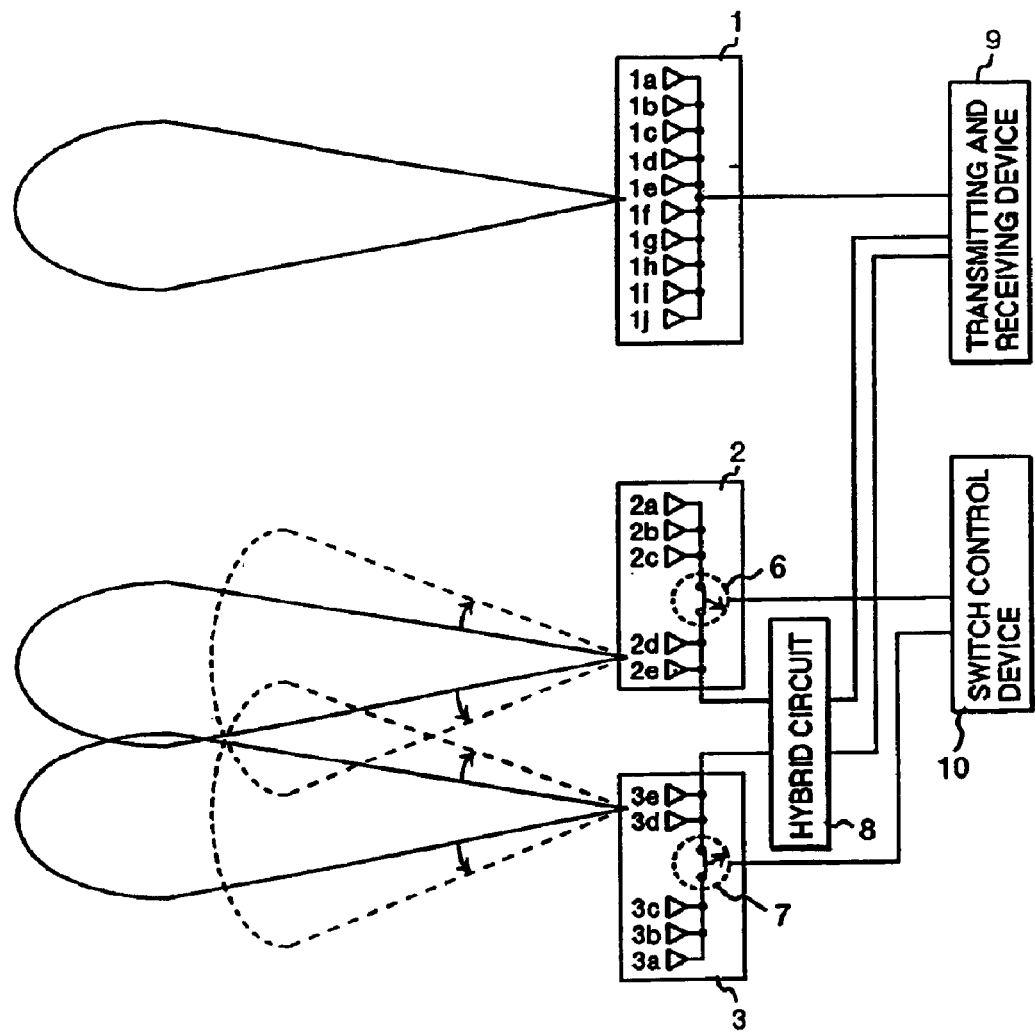
FIG. 4 is a block diagram showing a third embodiment of the monopulse radar system used for a car according to the invention.

FIG. 4 is a block diagram showing the configuration of a third embodiment of the radar system according to the invention. A monopulse radar system used for a car equivalent to this embodiment is characterized in that an antenna beam shape is switched by only a receiving antenna, the configuration and the control of a transmitting antenna are simplified, the system is simplified and the cost is reduced.

A signal is transmitted from a transmitting and receiving device 9 via a transmitting array antenna 1 composed of plural antenna elements 1a to 1j, the signal reflected on an obstacle is received by a receiving array antenna 2 composed of plural antenna elements 2a to 2e and a receiving array antenna 3 composed of plural antenna elements 3a to 3e, a sum signal and a difference signal respectively generated in a hybrid circuit 8 are sent to the transmitting and receiving device 9, and the velocity of a mobile body, the direction of an obstacle, distance up to the mobile body and relative velocity are detected. In this radar system, antenna switches 6 and 7 for connecting and disconnecting antenna element groups respectively composed of plural antenna elements 2a to 2c and 3a to 3c for switching a beam shape to the receiving array antennas 2 and 3 to a sharp angle/long distance or a wide angle/short distance and a switch control device 10 that controls the turning on or off of the antenna switches 6 and 7 are provided. The configuration of the transmitting and receiving device 9 is identical to that shown in FIG. 1 and the description is omitted. For another component, the same reference number as that in FIG. 1 is allocated to the substantially same component as that shown in FIG. 1. In the other embodiments described afterward, it is identical.

For example, when the antenna switches 6 and 7 are turned on by the switch control device 10 and the plural antenna elements 2a to 2e and 3a to 3e are respectively connected, a beam shape to the receiving array antennas 2 and 3 is respectively turned a sharp angle/long distance as shown by a full line in FIG. 4 and as antenna aperture length is reduced when the antenna switches 6 and 7 are turned off, that is, the antenna switches 6 and 7 respectively disconnect antenna element groups respectively composed of plural antenna elements 2a to 2c and 3a to 3c, a beam shape to the receiving array antennas 2 and 3 is respectively turned a wide angle/short distance as shown by a dotted line in FIG. 4. As described above, the detectable range of distance up to a mobile obstacle and relative velocity can be switched to a sharp angle/long distance or a wide angle/short distance by switching the antenna switches 6 and 7.

Various detection ranges can be acquired and azimuth resolution can be enhanced by increasing the number of the antenna elements and the antenna switches respectively shown in FIG. 4 or by varying the ratio of the transmitting array antenna 1 and the receiving array antennas 2 and 3. In this embodiment, the two receiving array antennas are provided, however, the similar various detection ranges can be acquired and azimuth resolution can be enhanced by increasing the number.

Figure 5:
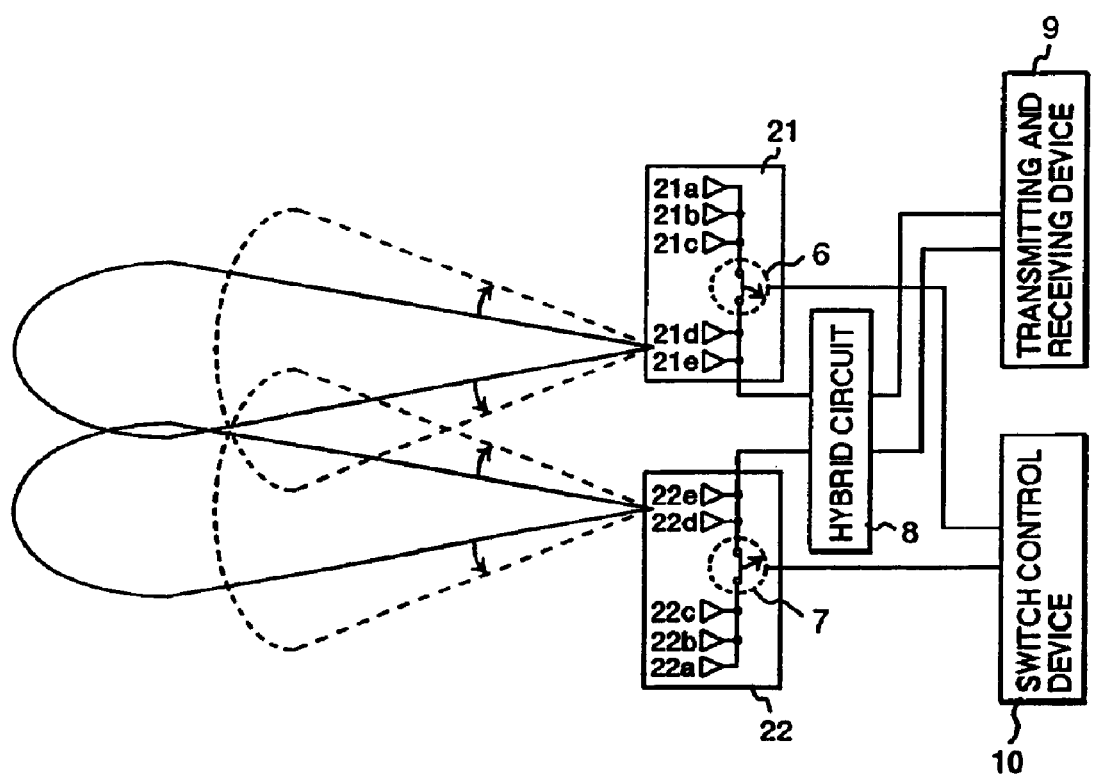
FIG. 5 is a block diagram showing a fourth embodiment of the monopulse radar system used for a car according to the invention.

FIG. 5 is a block diagram showing the configuration of a fourth embodiment of the radar system according to the invention. A monopulse radar system used for a car equivalent to this embodiment is characterized in that the system is simplified and the cost is reduced by sharing a transmitting antenna and a receiving antenna.

A signal is transmitted or received via the transmitting and receiving common array antennas 11 and 12 respectively composed of plural antenna elements 11a to 11e and 12a to 12e by a transmitting and receiving device 9, and the velocity of a mobile body, the direction of an obstacle, distance up to the mobile body and relative velocity are detected by a sum signal and a difference signal respectively generated in a hybrid circuit 8. In this radar system, antenna switches 6 and 7 for connecting and disconnecting antenna element groups respectively composed of the plural antenna elements 11a to 11c and 12a to 12c for switching a beam shape from/to the transmitting and receiving common array antennas 11 and 12 to a sharp angle/long distance or a wide angle/short distance and a switch control device 10 that controls the turning on or off of the antenna switches 6 and 7 are provided.

For example, when the antenna switches 6 and 7 are turned on by the switch control device 10 and the plural antenna elements 11a to 11e and 12a to 12e are respectively connected, a beam shape from/to the transmitting and receiving common array antennas 11 and 12 is turned a sharp angle/long distance as shown by a full line in FIG. 5 and as antenna aperture length is reduced when the antenna switches 6 and 7 are turned off, that is, antenna element groups respectively composed of the plural antenna elements 11a to 11c and 12a to 12c are respectively disconnected, a beam shape from/to the transmitting and receiving common array antennas 11 and 12 is respectively turned a wide angle/short distance as shown by a dotted line in FIG. 5. As described above, the detectable range of distance up to a mobile obstacle and relative velocity can be switched to a sharp angle/long distance or a wide angle/short distance by switching the antenna switches 6 and 7. In this embodiment, the two transmitting and receiving common array antennas are provided, however, the similar various detection ranges can be acquired and azimuth resolution can be enhanced by increasing the number.

Figure 6:
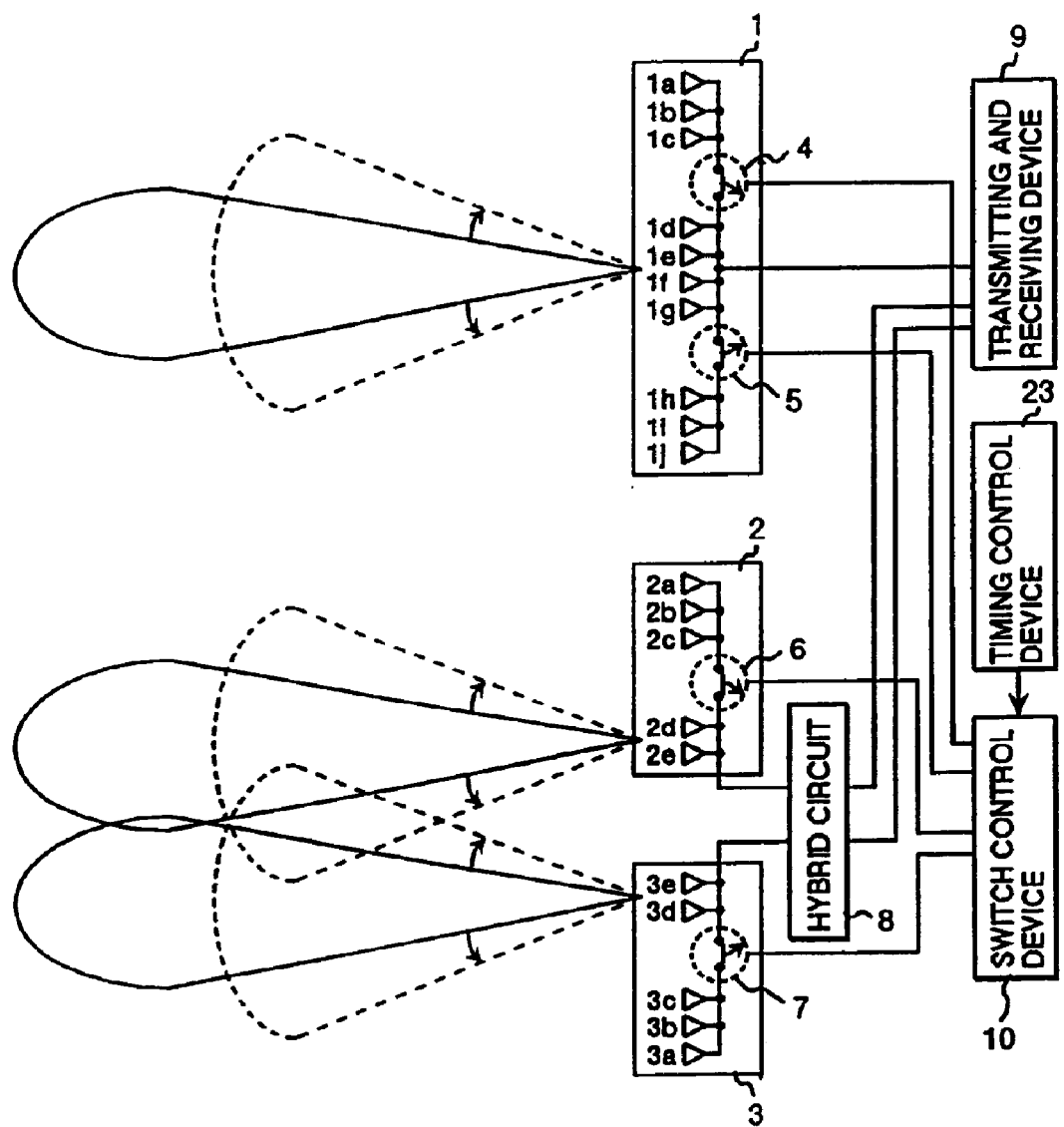
FIG. 6 is a block diagram showing a fifth embodiment of the monopulse radar system used for a car according to the invention.

FIG. 6 is a block diagram showing the configuration of a fifth embodiment of the radar system according to the invention. This embodiment is characterized in that a timing control device 23 is provided to the first embodiment shown in FIG. 1 and a signal for switching antenna switches 4 to 7 is output to a switch control device 10 every fixed time. A detection range is respectively switched by switching the antenna switches 4 to 7 every fixed time, and the error recognition of an obstacle and undetection can be prevented. It is described above that in the fifth embodiment, the timing control device 23 is provided to the first embodiment, however, it need scarcely be said that the fifth embodiment can be also applied to the second to fourth embodiments.

Figure 7:
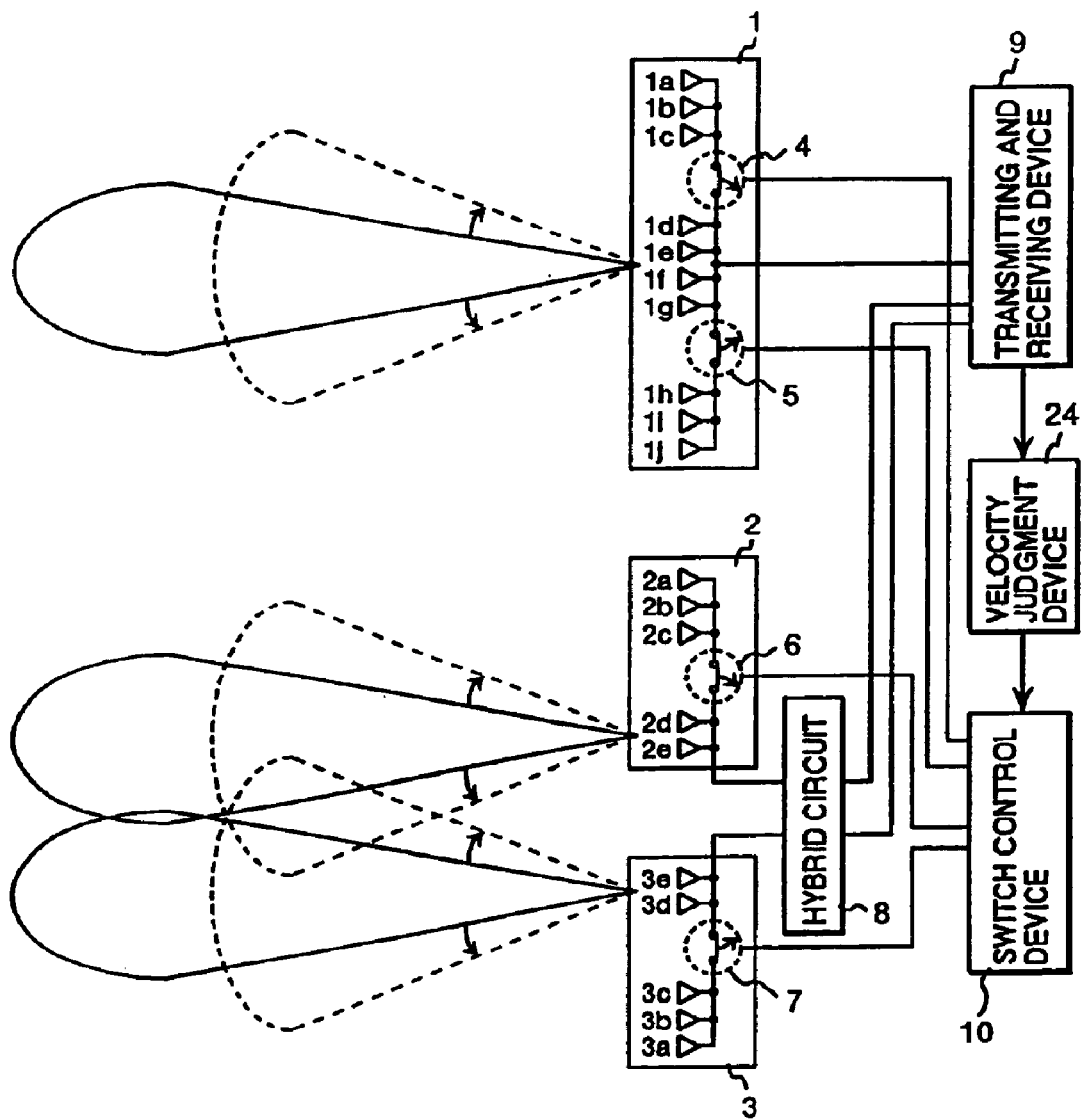
FIG. 7 is a block diagram showing a sixth embodiment of the monopulse radar system used for a car according to the invention.

FIG. 7 is a block diagram showing the configuration of a sixth embodiment of the radar system according to the invention. A radar system used for a car equivalent to this embodiment is characterized in that the velocity of a mobile body itself is also detected. This embodiment is characterized in that a velocity judgment device 24 is provided to the first embodiment shown in FIG. 1, the velocity of a mobile body on which the radar system is mounted is judged based upon the output of a transmitting and receiving device 9 and a switch control device 10 controls the switching of antenna switches 4 to 7 according to the output of the velocity judgment device 14. Concretely, as the detection of a remote obstacle and the prevention of an unnecessary reflected wave from the vicinity of the mobile body are required when the velocity of the mobile body is fast for example, the antenna switches 4 to 7 are respectively turned on to turn a beam shape to a sharp angle/long distance, and as a remote obstacle is conversely not required to be detected and an obstacle in the vicinity of the mobile body is required to be detected when the velocity of the mobile body is slow, the antenna switches 4 to 7 are respectively turned off to turn a beam shape to a wide angle/short distance. If the number of antenna elements and the switches is increased, a few beam shapes can be switched according to the velocity of the mobile body. As described above, optimum obstacle detection according to the velocity of the mobile body is enabled.

The case that a beam shape is switched according to the velocity of the mobile body on which the radar system is mounted is described above, however, needless to say, a beam shape can be also switched according to relative velocity with an obstacle. Further, it is described above that in the sixth embodiment, the velocity judgment device 14 is provided to the first embodiment, however, the sixth embodiment can be also applied to the second to fourth embodiments.

Figure 8:
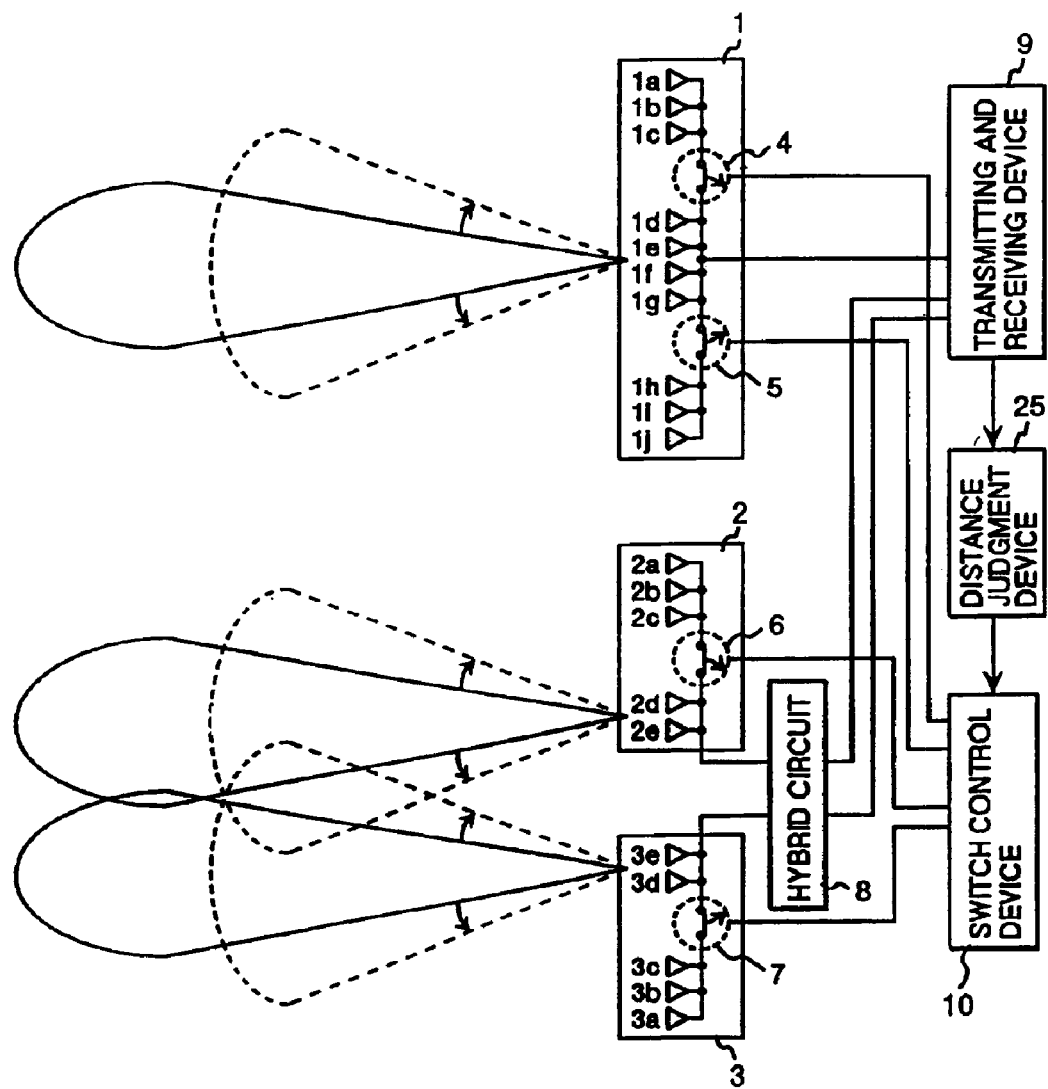
FIG. 8 is a block diagram showing a seventh embodiment of the monopulse radar system used for a car according to the invention.

FIG. 8 is a block diagram showing the configuration of a seventh embodiment of the radar system according to the invention. This embodiment is characterized in that a distance judgment device 25 is provided to the first embodiment shown in FIG. 1, distance between a mobile body and an obstacle is judged based upon the output of a transmitting and receiving device 9 and the operation of a switch control device 10 is controlled based upon the output of the distance judgment device 25. For example, in case distance between the mobile body on which the radar system is mounted and the obstacle is long, a beam shape is turned a sharp angle/long distance to enable detecting the remote obstacle and in case distance between the mobile body and the obstacle is short, a beam shape is turned a wide angle/short distance to enable detecting only the obstacle in the vicinity of the mobile body. It is described above that in the seventh embodiment, the distance judgment device 25 is provided to the first embodiment, however, the seventh embodiment can be also applied to the second to fourth embodiments.

Figure 9:
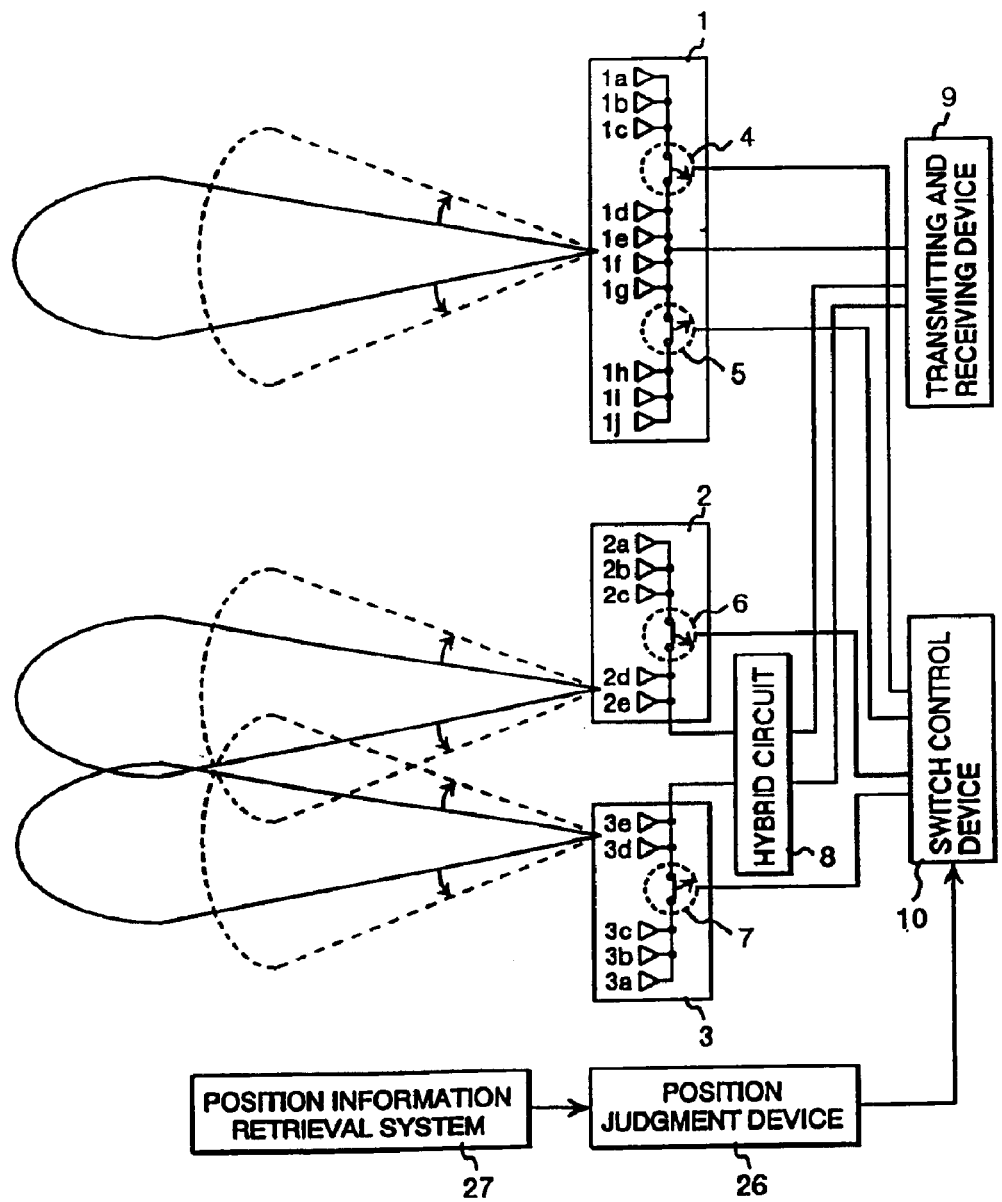
FIG. 9 is a block diagram showing an eighth embodiment of the monopulse radar system used for a car according to the invention.
Figure 10:
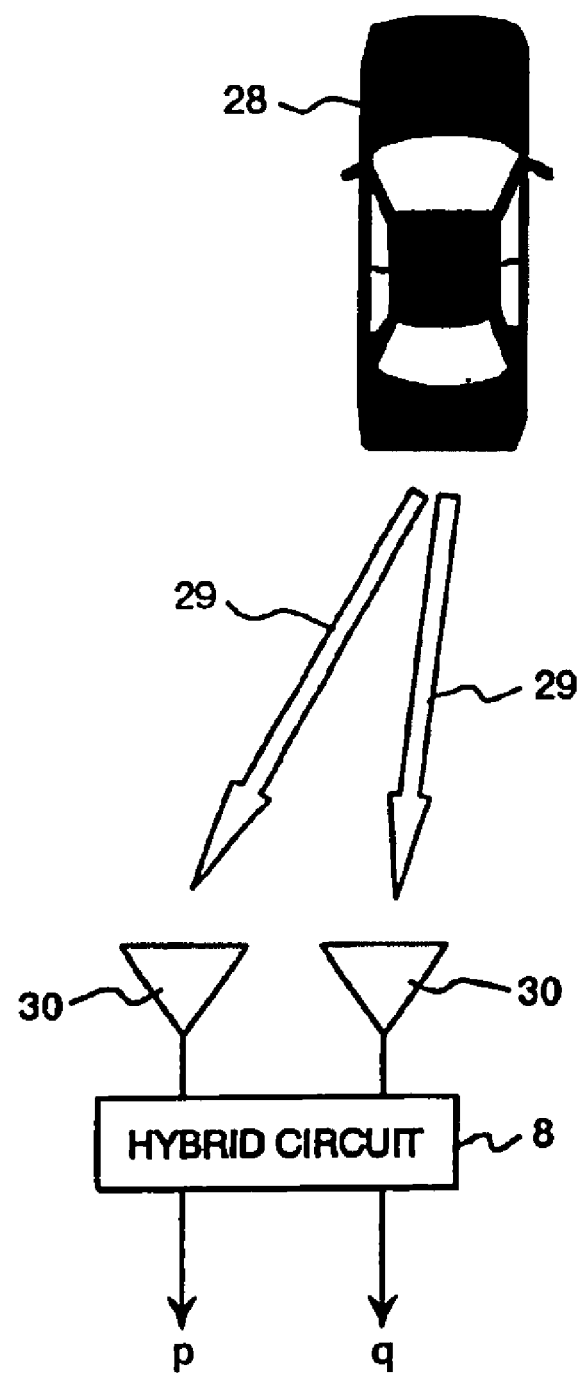
FIG. 10 is an explanatory drawing for explaining the monopulse system.
Figure 11:
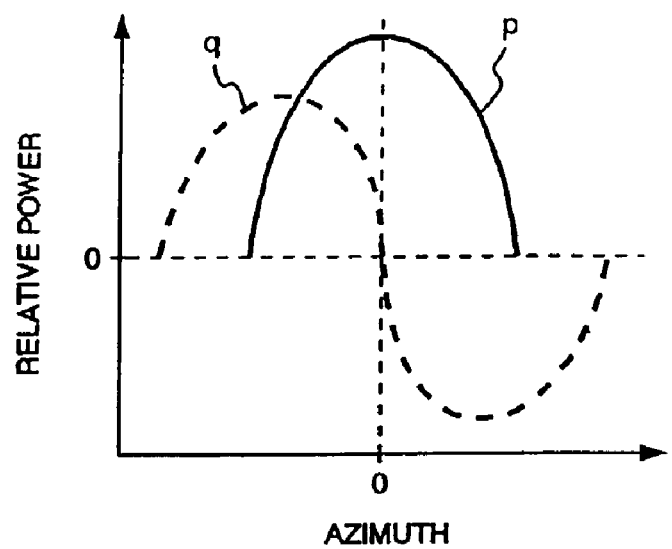
FIG. 11 shows the characteristics of the sum signal and the difference signal of the monopulse system.
Figure 12:
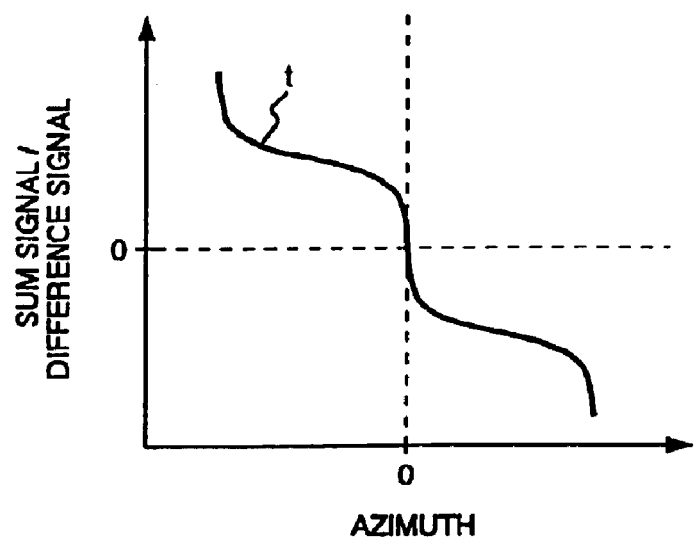
FIG. 12 shows the characteristic of the ratio of the sum signal and the difference signal of the monopulse system.

FIG. 9 is a block diagram showing the configuration of an eighth embodiment of the radar system according to the invention. This embodiment is characterized in that a position judgment device 26 is provided to the first embodiment shown in FIG. 1, position information from a position information retrieval system 27 such as a car navigation system mounted on a mobile body is judged by the position judgment device 26 and the operation of a switch control device 10 is controlled based upon the output of the position judgment device 26. For example while a mobile body on which a radar system and a car navigation system are mounted runs on a highway, a beam shape is turned a sharp angle/long distance to enable detecting a remote obstacle and while the mobile body runs on a general road in an urban area, a beam shape is turned a wide angle/short distance to enable detecting obstacles in a wide range in the vicinity of the mobile body.

It is described above that in the eighth embodiment, the position judgment device 26 is provided to the first embodiment, however, the eighth embodiment can be also applied to the second to fourth embodiments.

The array antennas in the first to eighth embodiments are formed on a dielectric substrate. For example, a patch antenna and a tri-plate antenna are used, a simple device such as FET is mounted on plural patch groups on the substrate as the antenna switch, a driving power source formed by a simple device such as FET can be simply built so that a driving signal is supplied from the rear surface via the dielectric substrate and miniaturization, lightening and the reduction of the cost are further enabled.

Figure 13:
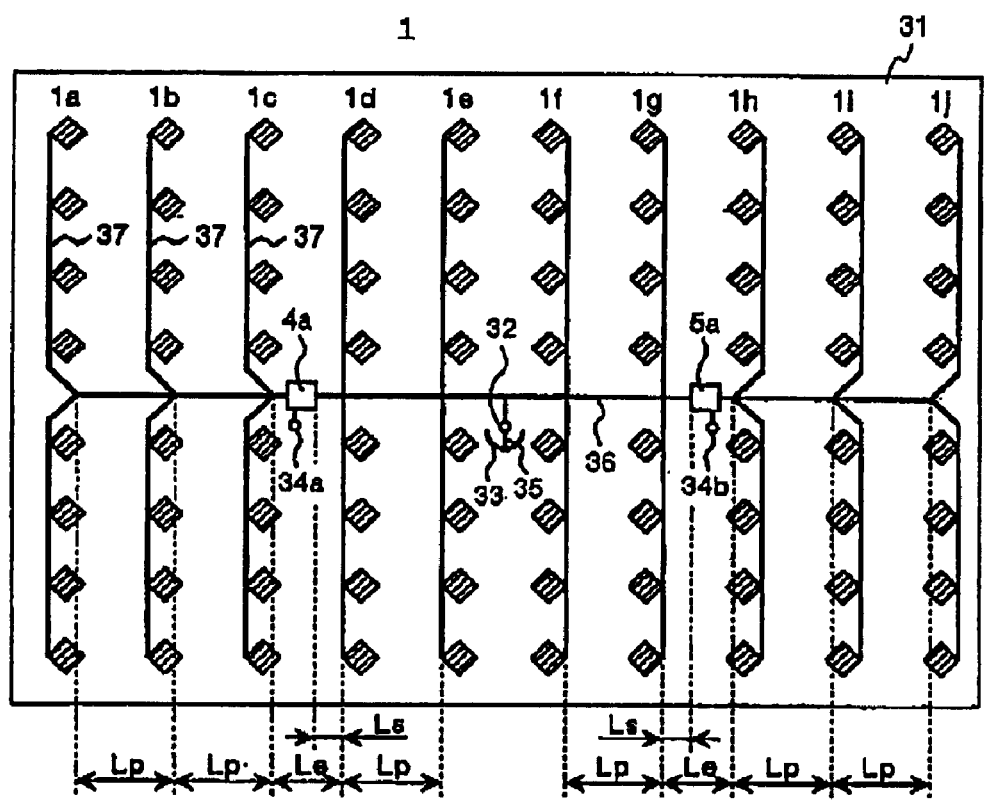
FIG. 13 is a plane view showing one embodiment of a transmitting array antenna used in a monopulse radar system according to this invention.

FIG. 13 is a plane view showing one embodiment of a transmitting array antenna used in a monopulse radar system according to this invention.

Patch trains 1a~1j each having a plurality of patch (or antenna) elements and main feeder line 36, branch feeder lines 37 are formed on a dielectric substrate 31, and compose a patch array antenna 1.

Each of the patch trains is connected with branch feeder lines 37 arranged in parallel.

Antenna switch 4a and 5a respectively are disposed between patch train 1c and 1d and between patch train 1g and 1h of main feeder line 36, which intersects perpendicular to branch feeder lines 37.

When antenna switch 4a and 5a are turned ON, beam of sharp angle/long distance is formed, since electric power inputted from the power supply part 32 is supplied to all of patch trains 1a~1j. And when antenna switches 4a and 5a are turned OFF, beam of a wide angel and a short distance is formed, since electric power inputted from the power supply part 32 is supplied to only patch trains 1d–1g.

Antenna switch 4a and 5a, which are MMIC consisted of GaAs etc. is turned on or turned off by operating the bias between the grounding line 33 grounded by the via hole, and bias terminals 34a, and 34b.

Unnecessary radiation at the time of switch-off can be prevented by making dielectric length Ls between patch train 1d and antenna switch 4a and between patch train 1g and antenna switch 5a as ½ dielectric wavelength.

The grounding line 33 and the power supply part 32 are connected by the short circuit line 35 having ¼ dielectric wavelength in length. Accordingly, short circuit is formed in signal line for direct current and low frequency region and a high impedance or OFF is formed in parallel for using frequency signal, all of static electricity and undesirable waves from the antenna side fall into earth. Therefore, there is no influence on the necessary high frequency component. By using the grounding line as ground terminals of antenna switches 4a, 5a there is no necessity for adding terminals on dielectric substrate newly and it is possible to reduce cost of the antenna.

In addition, the above-mentioned grounding line, a short circuit track, etc. may be arranged on the high frequency mounting circuit plane where an oscillator and a power amplifier are mounted.

Although all the intervals of patch trains have usually one dielectric wavelength since patch array antenna needs to excite all patch(es) by same phase, the dielectric lengths Le for patch train 1c and 1d and for 1g and 1h are smaller than the dielectric length Lp of other patch trains, since the patch array antenna of this embodiment consisted of on high dielectric substrate has antenna switch is arranged on MMIC formed on a high dielectric substrate.

There are a case that an unnecessary grating lobe may appear and a case that an antenna gain may be spoiled if the free space length of a patch train interval are uneven. Then, all the free space length of a patch train intervals can be fixed, and can rectify only a phase by branching patch train 1a–1c and 1h–1j aslant.

Concerning to a receiving array antenna, it can carry out similarly by preparing hybrid circuit in the power supply part 32 of transmitting array antenna. Moreover, the beam form can be changed effectively by use of MEMS high frequency switch having large isolation at the time of switch-off.

Although this antenna is explained as an antenna used for the first embodiment, this antenna is able to be used for the 2nd to 8th embodiments. In addition, although antenna switches used in each of the embodiments are formed by use of a switch of MMIC which consisted of semiconductor elements in order that the antenna switches may be realized in small lightweight, and economically, it is possible to change the beam shape effectively by using a machine switch with high isolation at the time of switch-off and low loss at the time of switch-on.

Although above-mentioned embodiments are explained as used for the radar system for vehicles, it is clear that above-mentioned embodiments can be used for uses other than for vehicles.

Miniaturization, lightening and the reduction of the cost can be further expected by using MMIC formed by a semiconductor device for the antenna switch in each embodiment. A beam shape can be efficiently switched by using a mechanical switch the loss of which is low when the mechanical switch is turned on and which completely isolates when it is turned off for the antenna switch. In the above-mentioned each embodiment, the radar system used for a car is described, however, it is clear that the radar system can be used for application except a vehicle.

Various other modification will be apparent to and can be readily made by those skilled in the art without departing from the scope and spirit of this invention. Accordingly, it is not intended that the scope of the claims appended hereto be limited to the description as set forth herein.

What is claimed is:

1. A monopulse radar system to detect an azimuth depending upon amplitude difference or phase difference between signals respectively received by a plurality of receiving antennas, the monopulse radar system comprising:

a transmitting array antenna including a plurality of antenna elements forming an antenna train;

a receiving array antenna including a plurality of antenna elements forming an antenna train, the receiving array antenna being used for one of a plurality of receiving antennas;

at least one antenna switch disposed among the plurality of antenna elements of at least one of the transmitting array antenna and the receiving array antenna; and a switch controller for turning ON/OFF said antenna switch to selectively activate said antenna elements so as to change an aperture length of at least one of the transmitting array antenna and the receiving array antenna thereby changing a beam shape of said at least one of the transmitting array antenna and the receiving array antenna, wherein said plurality of antenna elements of the transmitting array antenna and the receiving array antenna are formed on a dielectric substrate, and wherein a dielectric length between the antenna train formed by the plurality of antenna elements and the antenna switch included in at least one of the transmitting array antenna and the receiving array antenna is ½ dielectric wavelength.

2. The monopulse radar system according to claim 1, wherein said antenna switch is a MMIC formed on the dielectric substrate.

3. The monopulse radar system according to claim 2, wherein said MMIC is operated by the bias between a grounding line grounded by a via hole, and bias terminal formed on the dielectric substrate.

4. The monopulse radar system according to claim 3, further comprising:

a power supply part for supplying an electric power to the antenna train included in at least one of the transmitting array antenna and the receiving array antenna, wherein the grounding line and the power supply part are connected by the short circuit line having ¼ dielectric wavelength in length.

5. The monopulse radar system according to claim 4, wherein the beam shape is changed to a sharp angle/long distance shape or a wide angle/short distance shape by turning ON/OFF said antenna switch via the switch controller.

6. The monopulse radar system according to claim 4, wherein the transmitting array antenna and the receiving array antenna are formed by a common antenna composed of a plurality of antenna elements.

7. The monopulse radar system according to claim 5, wherein the transmitting array antenna and the receiving array antenna are formed by a common antenna composed of a plurality of antenna elements.

8. The monopulse radar system according to claim 4, wherein the switch controller turns ON/OFF said antenna switch periodically.

9. The monopulse radar system according to claim 5, wherein the switch controller turns ON/OFF said antenna switch periodically.

10. The monopulse radar system according to claim 4, wherein the switch controller turns ON/OFF said antenna switch based upon a distance between the monopulse radar system and an object of interest.

11. The monopulse radar system according to claim 5, wherein the switch controller turns ON/OFF said antenna switch based upon a distance between the monopulse radar system and an object of interest.

12. The monopulse radar system according to claim 6, wherein the switch controller turns ON/OFF said antenna switch based upon a distance between the monopulse radar system and an object of interest.

13. A monopulse radar system for a land transportation vehicle to detect an azimuth depending upon amplitude difference or phase difference between signals respectively received by a plurality of receiving antennas, the monopulse radar system comprising:

a transmitting array antenna including a plurality of antenna elements forming an antenna train;

a receiving array antenna including a plurality of antenna elements forming an antenna train, the receiving array antenna being used for one of a plurality of receiving antennas;

at least one antenna switch disposed among the plurality of antenna elements of at least one of the transmitting array antenna and the receiving array antenna; and a switch controller for turning ON/OFF said antenna switch based upon position information obtained by a position information retrieval system mounted on the vehicle, wherein said antenna switch is turned ON/OFF to selectively activate said antenna elements so as to change an aperture length of at least one of the transmitting array antenna and the receiving array antenna thereby changing a beam shape of said at least one of the transmitting array antenna and the receiving array antenna, wherein said a plurality of antenna elements of the transmitting array antenna and the receiving array antenna are formed on a dielectric substrate, and wherein a dielectric length between the antenna train formed by the plurality of antenna elements and the antenna switch included in at least one of the transmitting array antenna and the receiving array antenna is ½ dielectric wavelength.

14. The monopulse radar system according to claim 13, wherein said antenna switch is a MMIC formed on the dielectric substrate.

15. The monopulse radar system according to claim 14, wherein said MMIC is operated by the bias between a grounding line grounded by a via hole, and bias terminal formed on the dielectric substrate.

16. The monopulse radar system according to claim 15, further comprising:

a power supply part for supplying an electric power to the antenna train included in at least one of the transmitting array antenna and the receiving array antenna, wherein the grounding line and the power supply part are connected by the short circuit line having ¼ dielectric wavelength in length.

17. The monopulse radar system according to claim 16, wherein the beam shape is changed to a sharp angle/long distance shape or a wide angle/short distance shape by turning ON/OFF said antenna switch via the switch controller.

18. The monopulse radar system according to claim 16, wherein the transmitting array antenna and the receiving array antenna are formed by a common antenna composed of a plurality of antenna elements.

19. The monopulse radar system according to claim 16, wherein the switch controller turns ON/OFF said antenna switch based upon distance between the land transportation vehicle and an obstacle of interest.

20. The monopulse radar system according to claim 17, wherein the switch controller turns ON/OFF said antenna switch based upon distance between the land transportation vehicle and an obstacle of interest.

* * * * *